US011454315B2

(12) United States Patent
Matsuda et al.

(10) Patent No.: US 11,454,315 B2
(45) Date of Patent: Sep. 27, 2022

(54) TRANSMISSION CONTROLLER FOR TOROIDAL CONTINUOUSLY VARIABLE TRANSMISSION

(71) Applicant: KAWASAKI JUKOGYO KABUSHIKI KAISHA, Kobe (JP)

(72) Inventors: Kippei Matsuda, Kobe (JP); Shouji Miyanishi, Akashi (JP); Kenichi Nakashima, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 390 days.

(21) Appl. No.: 16/643,159

(22) PCT Filed: Aug. 21, 2018

(86) PCT No.: PCT/JP2018/030797
§ 371 (c)(1),
(2) Date: Feb. 28, 2020

(87) PCT Pub. No.: WO2019/044587
PCT Pub. Date: Mar. 7, 2019

(65) Prior Publication Data
US 2020/0347929 A1    Nov. 5, 2020

(30) Foreign Application Priority Data
Aug. 31, 2017  (JP) .............................. JP2017-166437

(51) Int. Cl.
*F16H 59/70*       (2006.01)
*F16H 59/38*       (2006.01)
(Continued)

(52) U.S. Cl.
CPC .............. *F16H 59/70* (2013.01); *F16H 59/38* (2013.01); *F16H 61/664* (2013.01);
(Continued)

(58) Field of Classification Search
CPC ........ F16H 59/70; F16H 59/38; F16H 61/664; F16H 63/062; F16H 2059/704;
(Continued)

(56) References Cited

U.S. PATENT DOCUMENTS 4,649,487 A  *  3/1987  Osanai ............. F16H 61/66259
                                              474/18
4,670,843 A  *  6/1987  Matsumura ....... B60W 30/1819
                                              474/18
(Continued)

FOREIGN PATENT DOCUMENTS

| JP | 2001-158400 A  |   | 6/2001  |
|----|----------------|---|---------|
| JP | 2005003071 A   | * | 1/2005  |
| JP | 2005-337462 A  |   | 12/2005 |

OTHER PUBLICATIONS

International Search Report for PCT/JP2018/030797 dated Nov. 13, 2018 [PCT/ISA/210].

*Primary Examiner* — Roger L Pang
(74) *Attorney, Agent, or Firm* — Sughrue Mion, PLLC

(57) ABSTRACT

A transmission controller of a toroidal continuously variable transmission includes a gain setting unit that adjusts a gain of closed-loop control for calculating a target value of a roller position in accordance with a change in a rotation speed of a disc in a first rotation speed range and a second rotation speed range higher than the first rotation speed range. The gain setting unit changes, in the first rotation speed range, the gain so that sensitivity of the closed-loop control decreases with an increase in the rotation speed, and changes, in the second rotation speed range, the gain so that a rate of decrease in the sensitivity of the closed-loop control with the increase in the rotation speed is smaller than that in the first rotation speed range.

4 Claims, 5 Drawing Sheets

(51) Int. Cl.
 *F16H 61/664* (2006.01)
 *F16H 63/06* (2006.01)
 *F16H 61/00* (2006.01)

(52) U.S. Cl.
 CPC ....... *F16H 63/062* (2013.01); *F16H 61/6646* (2013.01); *F16H 2059/704* (2013.01); *F16H 2061/0093* (2013.01)

(58) Field of Classification Search
 CPC .. F16H 2061/0075; F16H 59/40; F16H 59/36; F16H 2061/0093; F16H 61/6646
 See application file for complete search history.

(56) References Cited

U.S. PATENT DOCUMENTS

| | | | |
|---|---|---|---|
| 6,135,917 A * | 10/2000 | Takizawa | F16H 61/6648 477/98 |
| 2001/0003108 A1 | 6/2001 | Goi et al. | |
| 2013/0324344 A1* | 12/2013 | Pohl | F16H 61/6648 475/185 |
| 2020/0182351 A1* | 6/2020 | Kobayashi | F16H 61/6648 |

* cited by examiner

[FIG. 1]
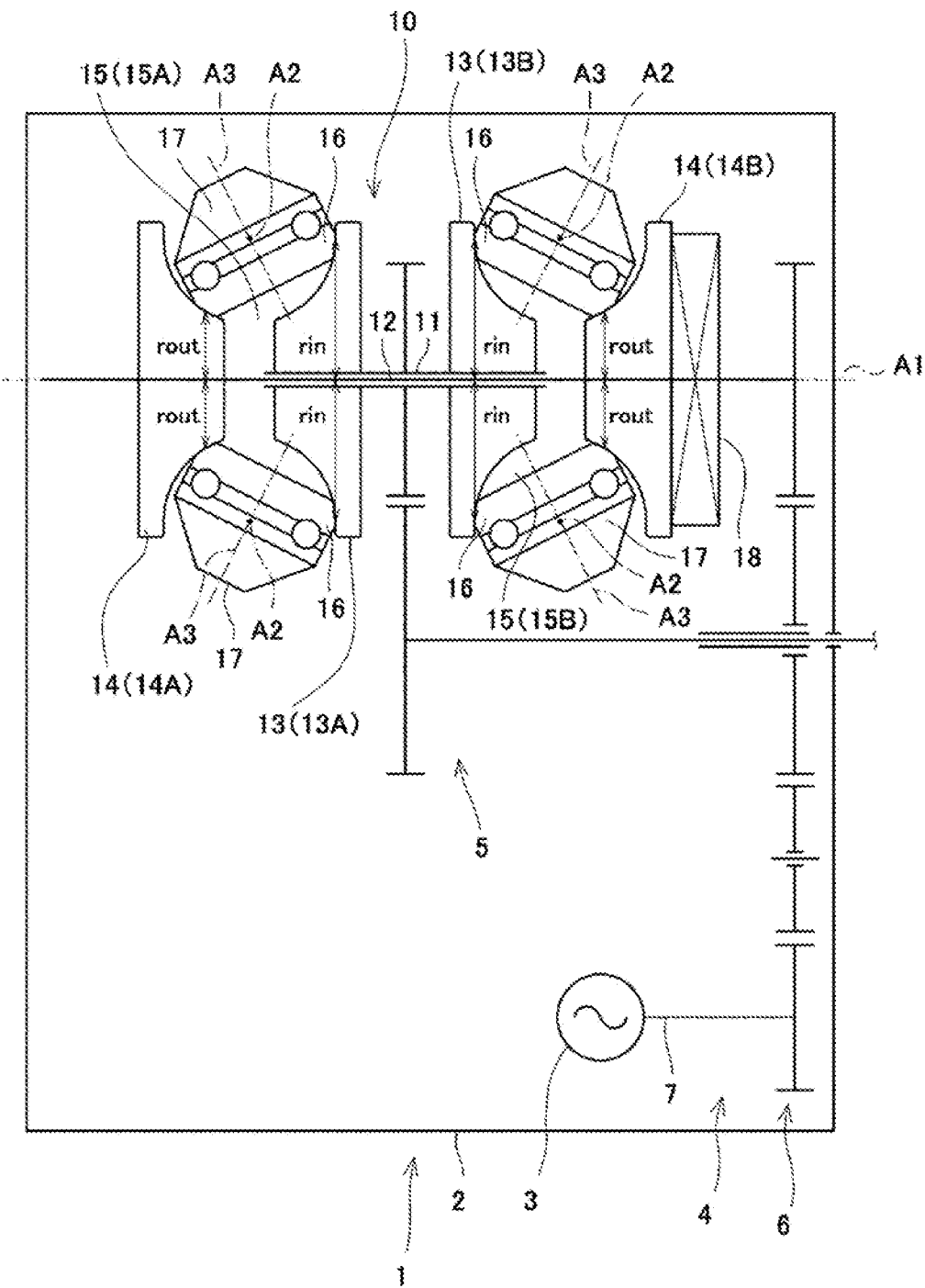

[FIG. 2]
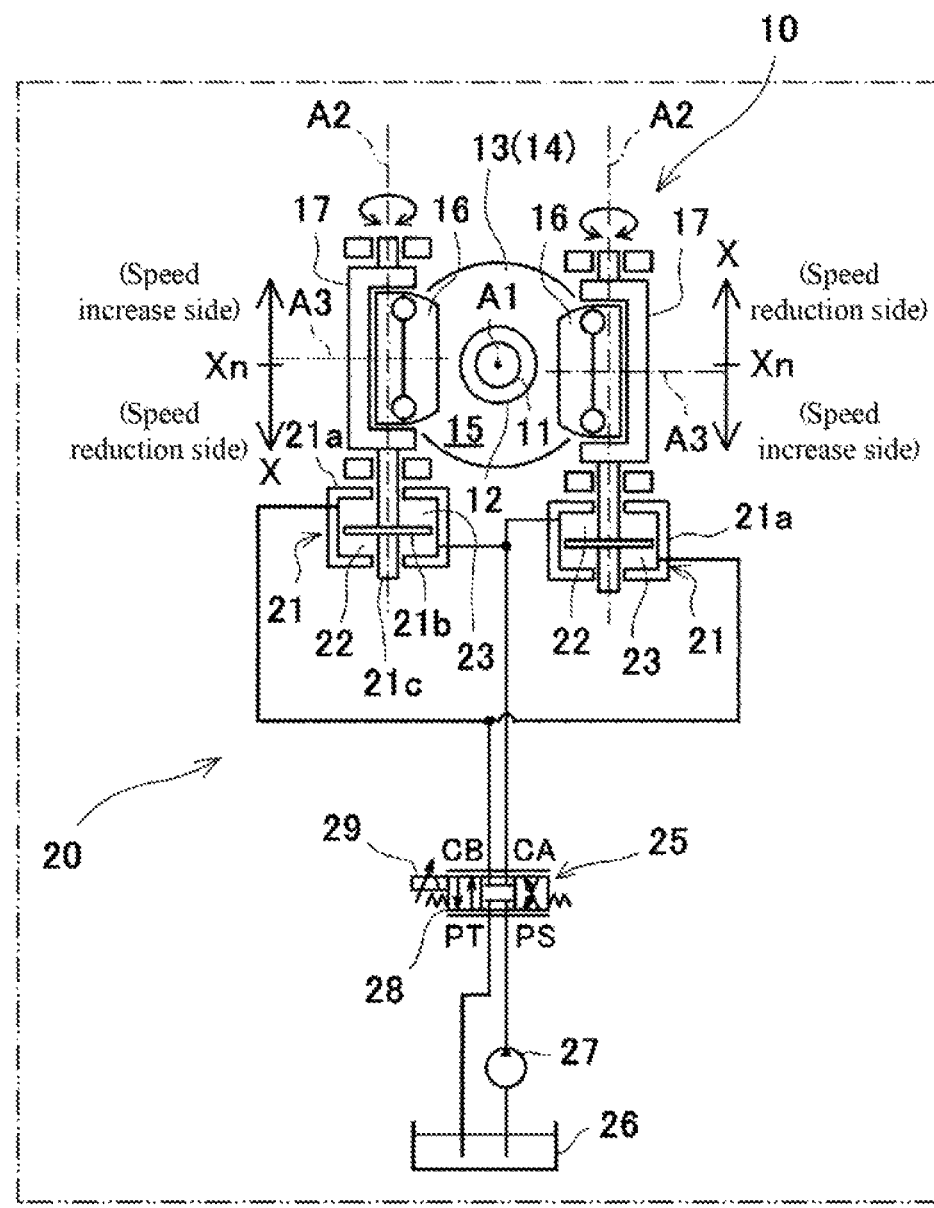

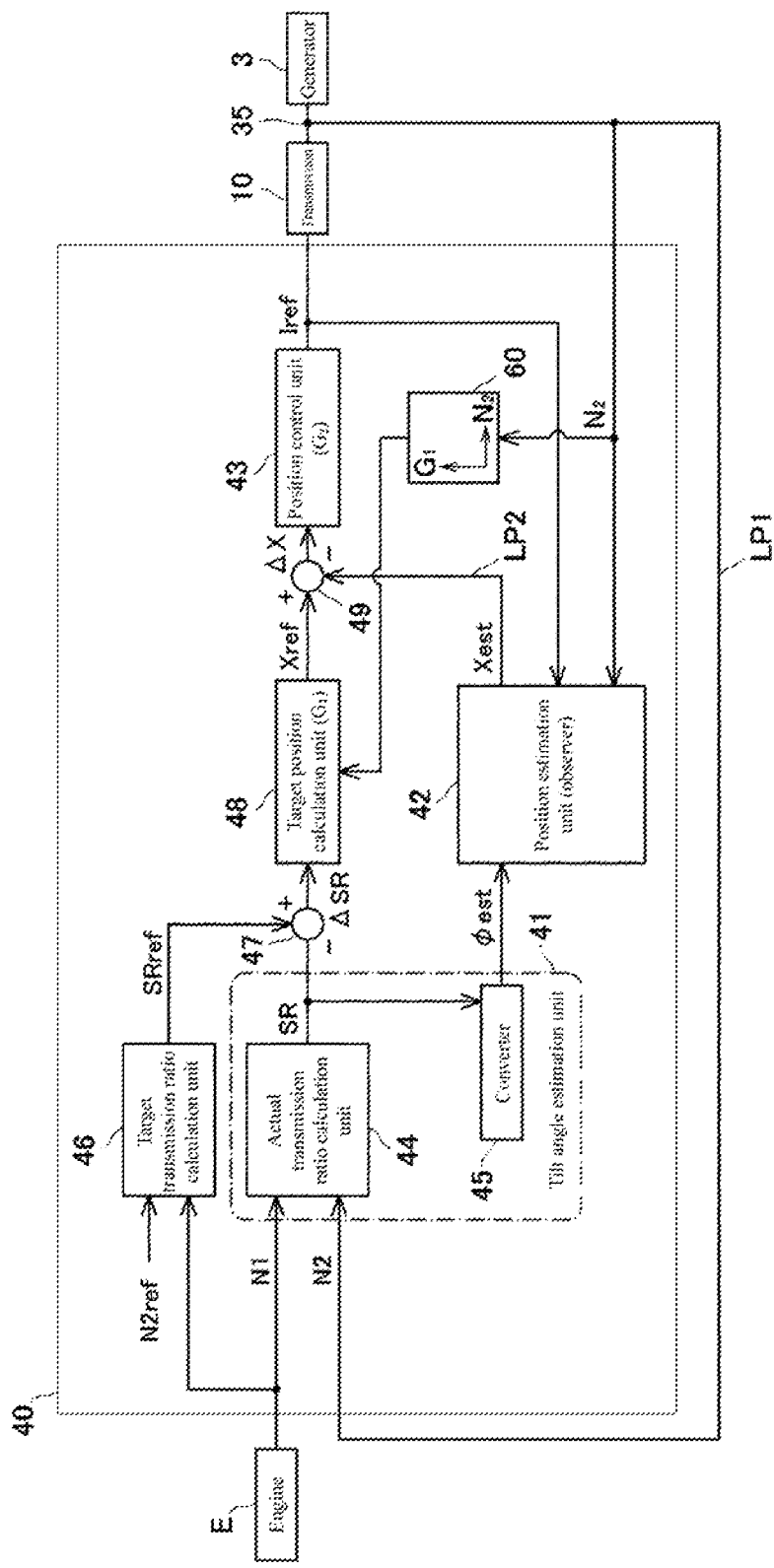
[FIG. 3]

[FIG. 4]
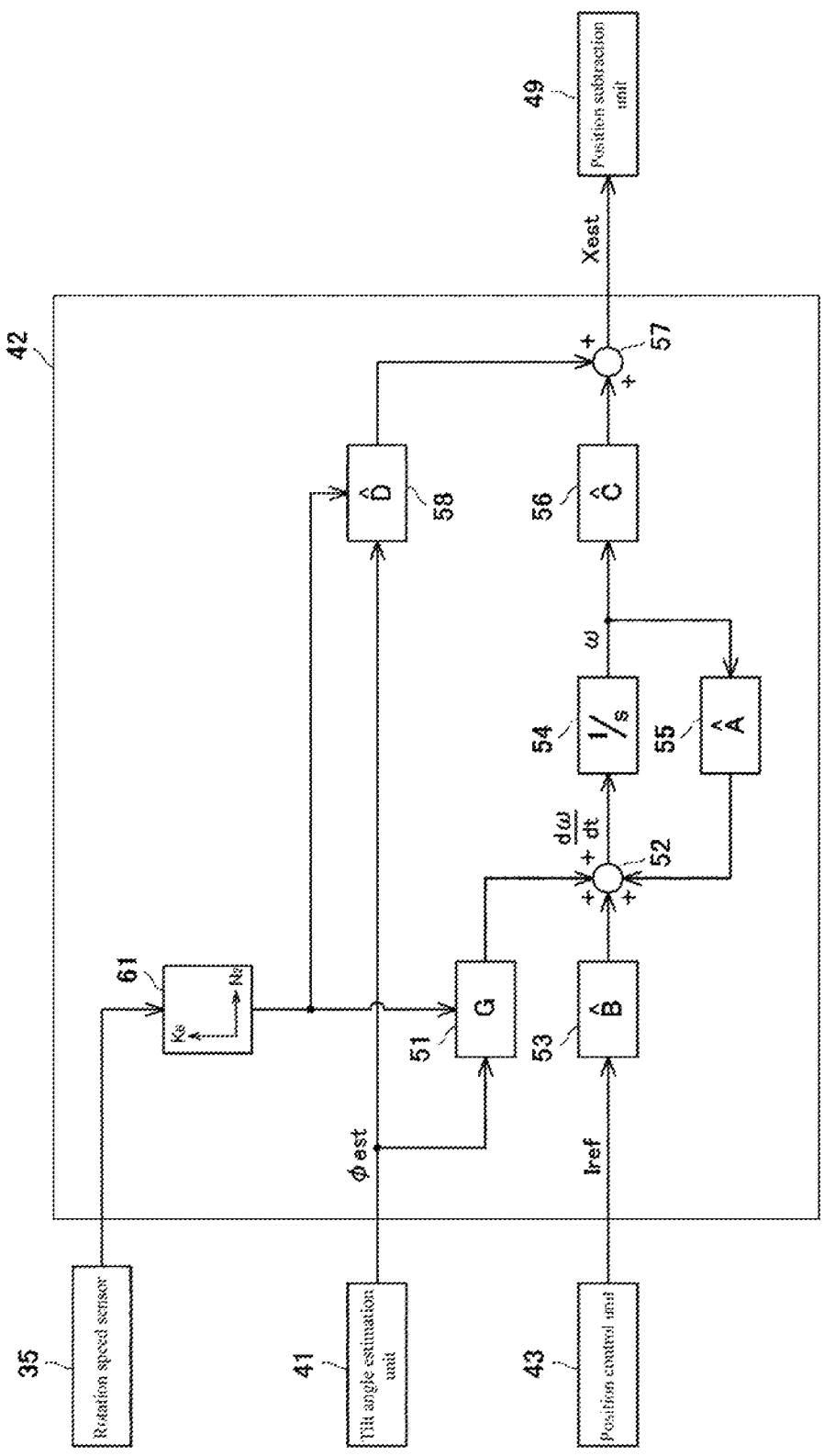

[FIG. 5]
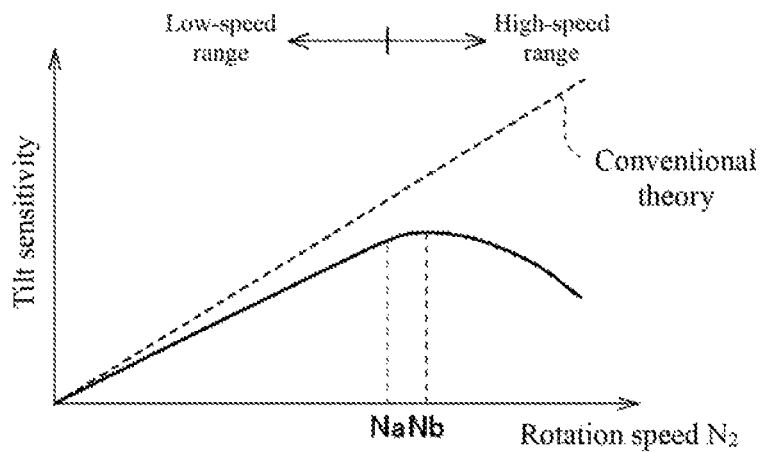
[FIG. 6]
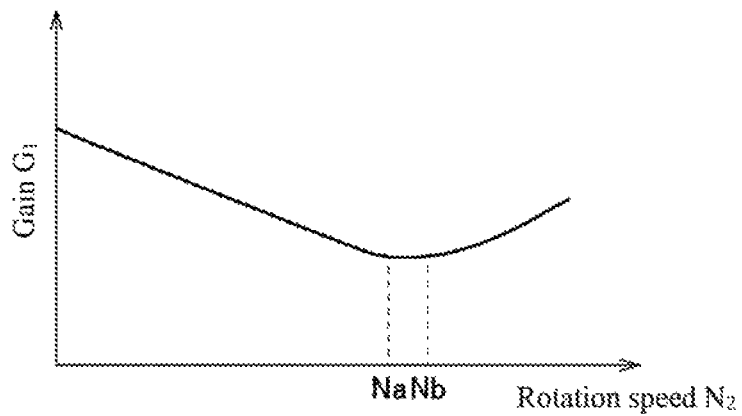
[FIG. 7]
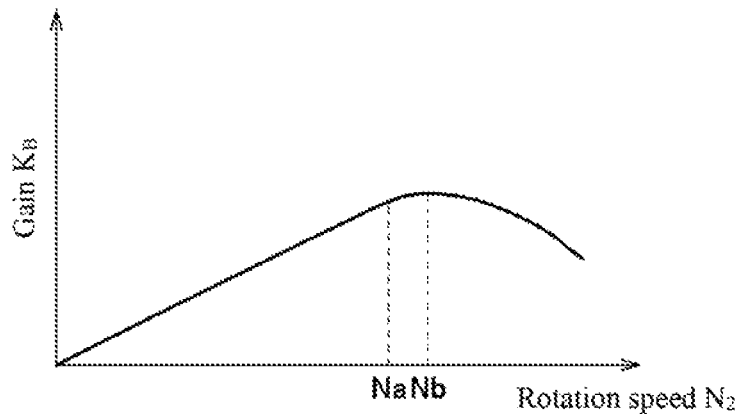

TRANSMISSION CONTROLLER FOR TOROIDAL CONTINUOUSLY VARIABLE TRANSMISSION

CROSS REFERENCE TO RELATED APPLICATIONS

This application is a National Stage of International Application No. PCT/JP2018/030797 filed Aug. 21, 2018, claiming priority based on Japanese Patent Application No. 2017-166437 filed Aug. 31, 2017.

TECHNICAL FIELD

The present invention relates to a transmission controller of a toroidal continuously variable transmission that changes a transmission ratio by changing a roller position of a power roller with respect to a disc by an actuator to change a tilt angle of the power roller.

BACKGROUND ART

In a toroidal continuously variable transmission, by changing a position of a power roller with respect to a disc by an actuator, the power roller is tilted to change a transmission ratio (for example, see Patent Literature 1).

CITATION LIST

Patent Literature

PTL 1: JP 2001-158400A

SUMMARY OF INVENTION

Technical Problem

By the way, the tilt sensitivity of the power roller differs depending on the rotation speed of the disc, and becomes higher as the rotation speed increases. From the viewpoint of control stability, it is necessary to reduce a gain of closed-loop control of the transmission ratio as the rotation speed increases, so that the shift sensitivity does not become too high and the transmission control becomes unstable (divergent). However, when the toroidal continuously variable transmission is to be used under high-speed conditions, if the gain of the closed-loop control of the transmission ratio is continuously reduced in inverse proportion as the rotation speed increases, the gain becomes considerably small in a high-speed range. If the gain is greatly reduced and the sensitivity of the closed-loop control of the transmission ratio is excessively reduced, it is assumed that the tilting of the power roller cannot sufficiently follow the fine fluctuation of the target transmission ratio. As described above, it is the current state of the art that the speed of a toroidal continuously variable transmission is limited because control responsiveness is impaired at the expense of control stability under high speed conditions.

Therefore, an object of the present invention is to expand the usable range of the disc rotation speed of a toroidal continuously variable transmission while achieving both control stability and control responsiveness.

Solution to Problem

According to one aspect of the present invention, there is provided a transmission controller of a toroidal continuously variable transmission that changes a transmission ratio by changing a roller position of a power roller with respect to a disc by an actuator to change a tilt angle of the power roller, the transmission controller including an actual transmission ratio acquisition unit that acquires an actual value of the transmission ratio; a target position calculation unit that calculates a target value of the roller position by closed-loop control so as to reduce a deviation between a command value of the transmission ratio and the actual value of the transmission ratio; a gain setting unit that adjusts a gain of the closed-loop control in accordance with a change in a rotation speed of the disc in a first rotation speed range and a second rotation speed range higher than the first rotation speed range, in which the gain setting unit changes, in the first rotation speed range, the gain so that sensitivity of the closed-loop control decreases with an increase in the rotation speed, and changes, in the second rotation speed range, the gain so that a rate of decrease in the sensitivity of the closed-loop control with the increase in the rotation speed is smaller than that in the first rotation speed range.

The present inventors have found that in the low-speed range, the tilt sensitivity of the power roller tends to increase proportionally as the disc rotation speed increases, whereas in the high-speed range, the tilt sensitivity does not increase proportionally as in the low-speed range, but the rate of increase in the tilt sensitivity of the power roller decreases as the disc rotation speed increases. According to the configuration, in the first rotation speed range (low-speed range), the sensitivity of the closed-loop control decreases with the increase in the rotation speed, so that transmission control is prevented from becoming unstable (divergent). In the second rotation speed range (high-speed range), the rate of decrease in the sensitivity of the closed-loop control with the increase in the rotation speed is smaller than that in the first rotation speed range, so that a decrease in control responsiveness is prevented. Therefore, both the control stability and the control responsiveness can be achieved even in the high-speed range, and the usable range of the disc rotation speed of the toroidal continuously variable transmission can be expanded.

The gain setting unit may change the gain so that the rate of decrease in the sensitivity in the second rotation speed range decreases continuously with the increase in the rotation speed.

According to the configuration, when the rotation speed of the disc continuously increases, the balance between the control stability and the control responsiveness can be continuously maintained.

The gain setting unit may change the gain so that a change in the gain with the increase in the rotation speed has an inverse correlation with a change in tilt sensitivity of the power roller with the increase in the rotation speed.

According to the configuration, it is possible to preferably achieve both the control stability and the control responsiveness over the entire rotation speed range.

The transmission controller of a toroidal continuously variable transmission may further include: a position estimation unit that estimates an actual value of the roller position; a position control unit that calculates an operation command value for the actuator by second closed-loop control so as to reduce a deviation between the actual value and the target value of the roller position; and a second gain setting unit that adjusts sensitivity of an internal model of the position estimation unit in accordance with a change in the rotation speed in the first rotation speed range and the second rotation speed range higher than the first rotation speed range, in which the second gain setting unit may increase, in the first rotation speed range, the sensitivity of the internal model with the increase in the rotation speed, and may change, in the second rotation speed range, the sensitivity of the internal model so that a rate of increase in the sensitivity of the internal model with the increase in the rotation speed is smaller than that in the first rotation speed range.

According to the configuration, in the configuration in which the second closed-loop control (minor closed-loop control) for calculating an operation command value for a control valve so as to reduce a deviation between a target value and an actual value of an operation position of a transmission element is executed together with the closed-loop control (major closed-loop control) for calculating the target value of the operation position of the transmission element so as to reduce the deviation between the command value and the actual value of the transmission ratio, in both the first rotation speed range (low-speed range) and the second rotation speed range (high-speed range), the sensitivity of the internal model of the position estimation unit also increases or decreases so as to follow the increase or decrease in the tilt sensitivity of the power roller in accordance with the increase or decrease in the rotation speed. Therefore, it is possible to prevent a decrease in the estimation accuracy of roller position due to the change in the rotation speed.

Advantageous Effects of Invention

According to the present invention, it is possible to expand the usable range of the disc rotation speed of the toroidal continuously variable transmission while achieving both the control stability and the control responsiveness.

BRIEF DESCRIPTION OF DRAWINGS

FIG. 1 is a skeleton diagram of an integrated drive generator according to an embodiment.

FIG. 2 is a hydraulic circuit diagram of the integrated drive generator shown in FIG. 1.

FIG. 3 is a block diagram of a transmission controller of the integrated drive generator shown in FIG. 1.

FIG. 4 is a block diagram of an internal model of a position estimation unit shown in FIG. 3.

FIG. 5 is a graph showing the relationship between tilt sensitivity of power rollers shown in FIG. 1 and the disc rotation speed.

FIG. 6 is a graph showing the relationship between a calculation gain of a target position calculation unit and the disc rotation speed shown in FIG. 3.

FIG. 7 is a graph showing the relationship between an internal gain of a position estimation unit and the disc rotation speed shown in FIG. 4.

DESCRIPTION OF EMBODIMENTS

Hereinafter, an embodiment will be described with reference to the drawings.

FIG. 1 is a skeleton diagram of an integrated drive generator 1 according to the embodiment. As shown in FIG. 1, the integrated drive generator (hereinafter referred to as "IDG") 1 is used as an AC power supply for an aircraft. The IDG 1 includes a casing 2 attached to an engine of an aircraft, and a generator 3 is accommodated in the casing 2 together with a constant speed drive (hereinafter referred to as "CSD") 4. The CSD 4 forms a power transmission path that transmits rotational power of an engine rotary shaft (not shown) of the aircraft to the generator 3, and a toroidal continuously variable transmission 10 (hereinafter referred to as "toroidal CVT") forms a part thereof. The rotational power of the engine rotary shaft is input to the toroidal CVT 10 via an input path 5 of the CSD 4, is changed in gear by the toroidal CVT 10, and is output to a generator shaft 7 via an output path 6 of the CSD 4. When the generator shaft 7 rotates, the generator 3 generates AC power at a frequency which is proportional to the rotation speed of the generator shaft 7. The transmission ratio SR of the toroidal CVT 10 is continuously changed so as to keep the rotation speed of the generator shaft 7 at an appropriate value (value corresponding to the frequency at which the electrical components in the aircraft are stably operated) regardless of fluctuations in the rotation speed of the engine rotary shaft. In this way, the frequency of the AC power generated by the generator 3 is maintained at an appropriate value, and the electrical components in the aircraft are stably operated.

In the toroidal CVT 10, a CVT input shaft 11 and a CVT output shaft 12 are coaxially arranged on the CVT axis line A1. Input discs 13 are provided on the CVT input shaft 11 so as to be integrally rotatable, and output discs 14 are provided on the CVT output shaft 12 so as to be integrally rotatable. The input disc 13 and the output disc 14 face each other and form an annular cavity 15. In the present embodiment, the toroidal CVT 10 is a double cavity type, and includes two sets of input discs 13A and 13B and output discs 14A and 14B having the same structure, and two cavities 15A and 15B are arranged in the direction of the CVT axis line A1. Two power rollers 16 (objects) are arranged in one cavity 15, and each power roller 16 is supported by a trunnion 17 so as to be rotatable around the rolling axis line A3. The trunnions 17 correspond to the power rollers 16, respectively, in a one-to-one correspondence. The trunnions 17 are supported by the casing 2 so that each of the trunnions 17 is displaceable in the extension direction of the tilt axis line A2 and is rotatable around the tilt axis line A2.

The power rollers 16 are supplied with traction oil, and pushed against the discs 13 and 14 by a clamping force generated by a clamping mechanism 18. The clamping mechanism 18 may be a cam type (sometimes referred to as a loading cam mechanism) or a hydraulic mechanism. As a result, a high-viscosity oil film is formed on the input side contact portion (contact interface between the power roller 16 and the input disc 13) and the output side contact portion (contact interface between the power roller 16 and the output disc 14). The CVT input shaft 11 is driven to rotate by the rotational power input from the input path 5. With the rotation of the CVT input shaft 11, the input discs 13 rotate together with the CVT input shaft 11 and the power rollers 16 are driven to rotate around the rolling axis line A3 by a shear resistance of the oil film which is generated in the input side contact portion. With the rotation of the power rollers 16 around the rolling axis line A3, the output discs 14 are driven to rotate by a shearing resistance of the oil film which is generated in the output side contact portion, and the CVT output shaft 12 rotates integrally therewith. The rotational power of the CVT output shaft 12 is output to the output path 6.

The transmission ratio SR is continuously changed in accordance with the roller positions X (positions in the extending directions of the tilt axis lines A2 of the power rollers 16). The transmission ratio SR is defined as the ratio of the output rotation speed (rotation speed of the CVT output shaft 12) N2 to the input rotation speed (rotation speed of the CVT input shaft 11) N1 of the toroidal CVT 10, and is equal to the radius ratio ($SR = N2/N1 = r_{in}/r_{out}$). The radius ratio is a ratio of the input side contact radius $r_{in}$ (distance from the CVT axis line A1 to the input side contact portion) to the output side contact radius $r_{out}$ (distance from the CVT axis line A1 to the output side contact portion). With the change in the roller positions X, the power rollers 16 rotate around the tilt axis lines A2 until a side slip is ceased, and tilt angles φ (rotation angles of the power rollers 16 around the tilt axis lines A2) are changed. With the change in the tilt angles φ, the input side contact portions and the output side contact portions are displaced, and hence the input side contact region radiuses $r_{in}$ and the output side contact region radiuses $r_{out}$ are continuously changed. Therefore, the radius ratio, that is, the transmission ratio SR is continuously changed.

FIG. 2 is a hydraulic circuit diagram of the integrated drive generator 1 shown in FIG. 1. As shown in FIG. 2, the roller positions X are changed by a hydraulic actuator 20. The hydraulic actuator 20 includes a plurality of hydraulic cylinders 21. The hydraulic cylinders 21 correspond to the power rollers 16 and the trunnions 17, respectively, in a one-to-one correspondence. The hydraulic cylinders 21 each include a body 21a, a piston 21b, and a rod 21c. The hydraulic cylinder 21 is a double-acting type, and the inside of the body 21a is partitioned into a speed increase chamber 22 and a speed reduction chamber 23 by the piston 21b. The rod 21c is arranged coaxially with the tilt axis line A2, connects the piston 21b to the trunnion 17, and moves in the extending direction of the tilt axis line A2 together with the trunnion 17 and the power roller 16 supported by the trunnion 17.

When oil is supplied to the speed increase chambers 22 and discharged from the speed reduction chambers 23, the roller positions X are changed to the speed increase side in the extending direction of the tilt axis lines A2. When the oil flows in the opposite direction, the roller positions X are changed to the speed reduction side that is the opposite side to the speed increase side in the extending direction of the tilt axis lines A2. The two power rollers 16 arranged in one cavity 15 are displaced in opposite directions in the extending direction of the tilt axis lines A2 in order to keep the radius ratio equal to each other when the roller positions X are changed.

When the roller positions X are changed to the speed increase side, the tilt angles φ increase at a tilt speed corresponding to the position change amounts (offset amounts), and the transmission ratio SR increases. By returning the roller positions X to the neutral points $X_n$, the increased transmission ratio SR is maintained. When the roller positions X are changed to the speed reduction side, the tilt angles φ decrease at a tilt speed corresponding to the position change amounts (offset amounts), and the transmission ratio SR decreases. By returning the roller positions X to the neutral points $X_n$, the decreased transmission ratio SR is maintained. The neutral angle $φ_n$ is approximately equal to the median value of the allowable tilt range, and the minimum transmission ratio $SR_{min}$ is approximately equal to the reciprocal of the maximum transmission ratio $SR_{max}$.

The hydraulic actuator 20 further includes a control valve 25. The hydraulic cylinders 21 correspond to the power rollers 16, respectively, in a one-to-one correspondence, whereas the control valve 25 is single for the plurality of power rollers 16, for example. The control valve 25 is a four-way switching valve, and has a supply port PS, a return port VT, a speed-increase control port CA, and a speed-reduction control port CB. A hydraulic pump 27 that sucks oil from the oil tank 26 is connected to the supply port PS, and the return port PT is connected to the oil tank 26. The speed-increase control port CA is connected to the speed increase chambers 22, and the speed reduction chambers 23 are connected to the speed-reduction control port CB. The control valve 25 is a spool valve, and the connection states of the ports are switched in accordance with the position of a spool 28. The control valve 25 is a three-position switching valve, and the spool 28 is positioned in the shut-off region (center position in FIG. 2), the speed increase region (left position in FIG. 2), or the speed reduction region (right position in FIG. 2).

In the shut-off region, the control ports CA, CB are cut-off from the supply port PS and the return port PT. At this time, the supply/discharge of oil to/from the speed increase chamber 22 and the speed reduction chamber 23 is stopped, and the transmission ratio is maintained. In the speed increase region, the speed-increase control port CA is connected to the supply port PS and the speed-reduction control port CB is connected to the return port PT. At this time, oil is supplied to the speed increase chamber 22 and discharged from the speed reduction chamber 23, and the transmission ratio increases. In the speed reduction region, the speed-increase control port CA is connected to the return port PT and the speed-reduction control port CB is connected to the supply port PS. At this time, oil is supplied to the speed reduction chamber 23 and discharged from the speed increase chamber 22, and the transmission ratio decreases. When the spool 28 is positioned in the speed increase region or the speed reduction region, the opening degrees of the supply port PS and the return port PT are variably set in accordance with the spool position in the region.

The control valve 25 includes a drive unit 29 that drives the spool 28 to control the spool position and opening degrees. The control valve 25 is, for example, a nozzle flapper type servo valve. The flow rate and pressure of oil supplied/discharged to/from the speed increase chamber 22 and the speed reduction chamber 23 are adjusted by the drive unit 29. The control valve 25 is an electric valve, and the drive unit 29 receives a drive signal from a transmission controller 40 and controls the spool position and opening degrees in accordance with the output value I (current value) of the drive signal.

The hydraulic actuator 20 includes a bias mechanism (not shown) that forcibly holds the roller positions X at predetermined positions when the drive signal satisfies a predetermined condition. For example, the bias mechanism forcibly returns the roller positions X to the lower limit points $X_{min}$ when the condition that the output value I is the zero value $I_z$ is satisfied, and maintains the transmission ratio SR at the minimum transmission ratio $SR_{min}$ on the safe side. Even when the condition that the output value I is a negative value is satisfied, the roller positions X are forcibly returned to the lower limit points $X_{min}$. If the output value I is the zero value $I_z$, the spool 28 is positioned not at the neutral position $SP_n$ in the shut-off region but at the bias position in the speed reduction region If the output value I becomes the zero value $I_z$ and the spool 28 is maintained at the bias position, the roller positions X, the tilt angles φ, and the transmission ratio SR reach the lower limit points $X_{min}$, the minimum tilt angles $φ_{min}$, and the minimum transmission ratio $SR_{min}$, respectively, and are maintained thereat. Conversely, in order to maintain the roller positions X by positioning the spool 28 at the neutral position $SP_n$ in the shut-off region, an output value I (neutral value $I_n$) of a drive signal for obtaining the neutral position $SP_n$ is set, and the drive signal is continuously output to the drive unit 29.

FIG. 3 is a block diagram of the transmission controller 40 of the integrated drive generator 1 shown in FIG. 1. As shown in FIG. 3, the transmission controller 40 includes a tilt angle estimation unit 41 that obtains the estimated value $\varphi_{est}$ which is a value obtained by estimating the actual value of the tilt angle, a position estimation unit 42 (position acquisition unit) that obtains estimated values $X_{est}$ which are values obtained by estimating actual values of the roller positions, and a position control unit 43 that obtains the operation command value $I_{ref}$ of the hydraulic actuator 20 so as to eliminate the deviation $\Delta X$ between target values $X_{ref}$ and the estimated values $X_{est}$ of the roller positions. The tilt angle estimation unit 41 obtains the estimated value $\varphi_{est}$ of the tilt angle by calculation without using a sensor that directly detects the tilt angle. The operation command value $I_{ref}$ is, for example, an output value (current value) of a drive signal given to the control valve 25 of the hydraulic actuator 20.

The tilt angle estimation unit 41 includes an actual transmission ratio calculation unit 44 (actual transmission ratio acquisition unit) that obtains the actual transmission ratio SR, and a converter 45 that converts the actual transmission ratio SR into the estimated value $\varphi_{est}$ of the tilt angle. The actual transmission ratio calculation unit 44 obtains the actual transmission ratio SR in accordance with the ratio between the input rotation speed N1 of the toroidal CVT 10 (rotation speed of the engine E) and the output rotation speed N2 of the toroidal CVT 10. The input rotation speed N1 and the output rotation speed N2 are detected by an input rotation speed sensor and an output rotation speed sensor, respectively.

The converter 45 obtains the estimated value $\varphi_{est}$ that is a value obtained by estimating the tilt angle in accordance with the actual transmission ratio SR based on the inverse function ($\varphi = f^{-1}$ (SR)) of the function of the tilt angle $\varphi$ with respect to the actual transmission ratio SR The converter 45 may actually perform the arithmetic operation of the inverse function. Further, in order to reduce the calculation load, a table in accordance with the inverse function may be created in advance and stored in the transmission controller 40, and the estimated value $\varphi_{est}$ may be obtained by table processing.

The transmission controller 40 includes a target transmission ratio calculation unit 46 that obtains the command value $SR_{ref}$ of the transmission ratio. The target transmission ratio calculation unit 46 calculates the command value $SR_{ref}$ of the transmission ratio in accordance with the ratio between the input rotation speed N1 detected by the input rotation speed sensor and the command value $N2_{ref}$ of the output rotation speed stored in advance. In the present embodiment, the command value $N2_{ref}$ of the output rotation speed is set to a constant value corresponding to a frequency suitable for the operation of electrical components in the aircraft. For example, when the target frequency $f_{ref}$ is 400 Hz, the number of poles of the generator 3 is 2, and the detection target of the output rotation speed sensor is the rotation speed of the generator shaft 7, the command value $N2_{ref}$ is a constant value of 24,000 rpm.

The transmission controller 40 includes a transmission ratio subtraction unit 47 that obtains the deviation $\Delta SR$ between the command value $SR_{ref}$ of the transmission ratio and the actual transmission ratio SR ($\Delta SR = SR_{ref} - SR$). The transmission controller 40 includes a target position calculation unit 48 that calculates the target values $X_{ref}$ of the roller positions so as to reduce the deviation $\Delta SR$ of the transmission ratio. That is, the target position calculation unit 48 calculates the target values $X_{ref}$ of the roller positions with the predetermined calculation gain $G_1$ so that the deviation $\Delta SR$ approaches zero by major closed-loop control LP1 (first closed-loop control; feedback control). The target position calculation unit 42 performs gain adjustment to change the calculation gain $G_1$ of the target value $X_{ref}$ in accordance with the rotation speed of the input disc 13 or the output disc 14 of the toroidal CVT 10 (for example, the output rotation speed N2 in the present embodiment). Specifically, the target position calculation unit 48 calculates the target value $X_{ref}$ based on the calculation gain $G_1$ determined by a gain setting unit 60 in accordance with the output rotation speed N2 detected by a rotation speed sensor 35. That is, the gain setting unit 60 adjusts the calculation gain $G_1$ of target position calculation unit 48 as the gain of the major closed-loop control LP1 in accordance with the change in the rotation speed N2. The calculation gain $G_1$ will be described later.

The transmission controller 40 includes a position subtraction unit 49 that obtains the deviation $\Delta X$ between the target values $X_{ref}$ and the estimated values $X_{est}$ of the roller positions ($\Delta X = X_{ref} - X_{est}$). The position control unit 43 calculates the operation command value $I_{ref}$ of the hydraulic actuator 20 so as to reduce the deviation $\Delta X$. That is, the position control unit 43 calculates the operation command value $I_{ref}$ with the predetermined calculation gain $G_2$ so that the deviation $\Delta X$ approaches zero by minor closed-loop control LP2 (second closed-loop control; feedback control). In the present embodiment, the calculation gain $G_2$ is constant.

The minor closed-loop control LP2 returning to the position subtraction unit 49 is a loop included in the major closed-loop control LP1 returning to the transmission ratio subtraction unit 47. When the control valve 25 of the hydraulic actuator 20 is given a drive signal indicated by the operation command value $I_{ref}$ the actual roller positions are brought closer to the target values $X_{ref}$. Then, the actual transmission ratio SR is brought closer to the command value $SR_{ref}$ and the output rotation speed N2 is brought closer to the command value $N2_{ref}$.

FIG. 4 is a block diagram of an internal model of the position estimation unit 42 shown in FIG. 3. As shown in FIG. 4, the position estimation unit 42 is an observer created using the models of the tilt angles $\varphi$ and the model of the hydraulic actuator 20, and estimates the roller positions X. The models of the tilt angles $\varphi$ are expressed by Expression (1), and the model of the hydraulic actuator 20 is expressed by Expression (2).

[Math. 1]

$$\phi = \frac{K_2}{s(1+T_2 s)} X \qquad (1)$$

[Math. 2]

$$X = \frac{K_1}{s} Iref \qquad (2)$$

Here, $K_1$ is a first proportional gain, $K_2$ is a second proportional gain, $T_2$ is a time constant, and s is a Laplace operator.

With Expressions (1) and (2), a model for designing an observer is expressed by Expression (3).

[Math. 3]
$$\phi \cong \frac{K}{s^2} Iref \quad (3)$$

Here, $K = K_1 K_2$ and $T_2 \approx 0$.

Next, the matrices A and B expressed in the state space are divided as shown in Expression (4) to (6).

[Math. 4]
$$\frac{dx}{dt} = Ax + BIref \quad (4)$$

[Math. 5]
$$X = Cx \quad (5)$$

[Math. 6]
$$\{A, B, C\} = \left\{ \begin{pmatrix} 0 & K_1 \\ 0 & 0 \end{pmatrix}, \begin{pmatrix} 0 \\ K_2 \end{pmatrix}, (1 \ 0) \right\} \quad (6)$$

Here, x is a state variable. At this time, Expression (7) and (8) hold.

[Math. 7]
$$A := \begin{pmatrix} A_{11} & A_{12} \\ A_{21} & A_{22} \end{pmatrix} \quad (7)$$

[Math. 8]
$$B := \begin{pmatrix} B_1 \\ B_2 \end{pmatrix} \quad (8)$$

Therefore, $A_{11} = A_{21} = A_{22} = B_1 = 0$, $A_{12} = K_1$, and $B_2 = K_2$ hold.

Next, the determinant design parameter L is introduced as shown in Expression (9), and the observer pole (the eigenvalue of the estimated matrix ^ A) is adjusted to be stable.

[Math. 9]
$$\hat{A} = A_{22} - LA_{12} \quad (9)$$

Other parameters (estimated matrix ^ B, matrix G, estimated matrix ^ C, and estimated matrix ^ D) are obtained using design parameter L in accordance with Expressions (10) to (13).

[Math. 10]
$$\hat{B} = -LB_1 + B_2 \quad (10)$$

[Math. 11]
$$G = \hat{A}L + A_{21} - LA_{11} \quad (11)$$

[Math. 12]
$$\hat{C} = \begin{pmatrix} 0 \\ 1 \end{pmatrix} \quad (12)$$

[Math. 13]
$$\hat{D} = \begin{pmatrix} 1 \\ L \end{pmatrix} \quad (13)$$

From the above, the minimum dimension observer represented by Expressions (14) and (15) is obtained from the models of the tilt angles φ (see Expression (1)) and the model of the hydraulic actuator 20 (see Expression (2)).

[Math. 14]
$$\frac{d\omega}{dt} = \hat{A}\omega + \hat{B}Iref + G\phi est \quad (14)$$

[Math 15]
$$Xest = \hat{C}\omega + \hat{D}\phi est \quad (15)$$

Here, ω is the state of the minimum dimension observer.

The position estimation unit 42 obtains the estimated values $X_{est}$ of the roller positions (see Expression (15)) by performing calculations in accordance with Expressions (14) and (15). In the position estimation unit 42, the estimated value $\varphi_{est}$ of the tilt angle is given to the arithmetic circuit 51 having the matrix G from the tilt angle estimation unit 41, and $G_{\varphi est}$ (see Expression (14)) is given to an addition unit 52 from the arithmetic circuit 51. The operation command value $I_{ref}$ of the hydraulic actuator 20 is given from the position control unit 43 to an arithmetic circuit 53 for the estimated matrix ^ B, and ^ $BI_{ref}$ (see Expression (14)) is given from the arithmetic circuit 53 to the addition unit 52. The output of the addition unit 52 is given to an integration circuit 54 having a transfer function 1/s, and the state ω is output from the integration circuit 54. The state ω is given to an arithmetic circuit 55 having the estimated matrix ^ A, and ^ Aω (see Expression (14)) is given from the arithmetic circuit 55 to the addition unit 52. The addition unit 52 derives a differential value dω/dt of the state ω by adding ^ Aω, ^ $BI_{ref}$, and $G_{\varphi est}$ (see Expression (14)), and gives this to the integration circuit 54.

The state ω is also given to an arithmetic circuit 56 for the estimated matrix ^ C, and ^ Cω (see Expression (15)) is given from the arithmetic circuit 56 to an addition unit 57. The estimated value $\varphi_{est}$ of the tilt angle is also given from the tilt angle estimation unit 41 to an arithmetic circuit 58 for the estimated matrix ^ D, and ^ $D_{\varphi est}$ (see Expression (15)) is given from the arithmetic circuit 58 to the addition unit 57. The addition unit 57 derives the estimated values $X_{est}$ of the roller positions by adding ^ Cω and ^ $D_{\varphi est}$ (see Expression (15)), and outputs this to the position subtraction unit 49.

The arithmetic circuit 51 having the matrix G and the arithmetic circuit 58 for the estimation matrix ^ D derive the matrixes G ^ and ^ D based on the internal gain $K_B$ determined by a gain setting unit 61 in accordance with the output rotation speed N2 detected by the rotation speed sensor 35. In this way, the position estimation unit 42 obtains the estimated values $X_{est}$ of the roller positions based on the estimated value $\varphi_{est}$ of the tilt angle, the operation command value $I_{ref}$ of the hydraulic actuator 20, and the rotation speed N2. The internal gain $K_B$ will be described later.

FIG. 5 is a graph showing the relationship between the tilt sensitivity of the power rollers 16 shown in FIG. 1 and the disc rotation speed N2. As indicated by the broken line in FIG. 5, according to the conventional theory, the tilt sensitivity of the power rollers 16 is considered to increase proportionally as the disc rotation speed N2 increases. The "tilt sensitivity" means the ratio of the tilt angular velocity of the power rollers 16 to the roller positions X (offset amount from the neutral point X) of the power rollers 16.

However, as indicated by the solid line in FIG. 5, the present inventors have found that in the low-speed range, the tilt sensitivity of the power rollers 16 tends to increase proportionally as the disc rotation speed N2 increases, whereas in the high-speed range, the tilt sensitivity does not increase proportionally as in the low-speed range, but the rate of increase in the tilt sensitivity of the power rollers 16 decreases as the disc rotation speed N2 increases. In the example of the solid line in FIG. 5, in the low-speed range where the disc rotation speed N2 is lower than the predetermined rotation speed Na, the tilt sensitivity increases proportionally with the increase in the disc rotation speed N2, but in the high-speed range where the disc rotation speed N2 is higher than the predetermined rotation speed Na, the rate of increase in the tilt sensitivity with the increase in the disc rotation speed N2 continuously decreases. When the tilt sensitivity indicates the maximum value at the predetermined rotation speed Nb, and the disc rotation speed N2 becomes higher than the rotation speed Nb (Nb>Na), the rate of increase in the tilt sensitivity turns negative. Based on such knowledge, the calculation gain $G_1$ of the target position calculation unit 48 and the internal gain $K_B$ of the position estimation unit 42 are adjusted in accordance with the disc rotation speed N2 as described below.

FIG. 6 is a graph showing the relationship between the calculation gain $G_1$ of the target position calculation unit 48 and the disc rotation speed N2 shown in FIG. 3. As shown in FIG. 6, in the low-speed range, the calculation gain $G_1$ is decreased so that the sensitivity of the major closed-loop control LP1 decreases with the increase in the disc rotation speed N2. On the other hand, in the high-speed range, the rate of decrease in the sensitivity of the major closed-loop control LP1 with the increase in the disc rotation speed N2 is smaller than the rate of decrease in the sensitivity of the major closed-loop control LP1 in the low-speed range.

Specifically, in the low-speed range, the calculation gain $G_1$ decreases proportionally with the increase in the disc rotation speed N2, but in the high-speed range, the rate of decrease in the calculation gain $G_1$ with the increase in the disc rotation speed N2 continuously decreases. When the calculation gain $G_1$ indicates the minimum value at the predetermined rotation speed Nb, and the disc rotation speed N2 becomes larger than the rotation speed Nb, the decrease rate of the calculation gain $G_1$ turns positive. That is, the gain setting unit 60 (FIG. 3) changes the calculation gain $G_1$ so that the change in the calculation gain $G_1$ with the increase in the disc rotation speed N2 has an inverse correlation with the change in the tilt sensitivity of the power rollers 16 with the increase in the disc rotation speed N2.

In this way, in the low-speed range, the sensitivity of the major closed-loop control LP1 decreases with the increase in the disc rotation speed N2, so that the transmission control is prevented from becoming unstable (divergent). In the high-speed range, the rate of decrease in sensitivity of the major closed-loop control LP1 with the increase in the disc rotation speed N2 is smaller than that in the low-speed range, so that a decrease in control responsiveness is prevented. Therefore, both the control stability and the control responsiveness can be achieved even in the high-speed range, and the usable range of the disc rotation speed N2 of the toroidal CVT 10 can be expanded.

FIG. 7 is a graph showing the relationship between the internal gain $K_B$ of the position estimation unit 42 and the disc rotation speed N2 shown in FIG. 4. As shown in FIG. 7, in the low-speed range, the internal gain $K_B$ is increased so that the position estimation sensitivity of the position estimation unit 42 increases with the increase in the disc rotation speed N2. On the other hand, in the high-speed range, the rate of increase in the internal gain $K_B$ becomes smaller than the rate of increase in the internal gain $K_B$ in the low-speed range as the disc rotation speed N2 increases. That is, in the high-speed range, the rate of increase in the internal gain $K_B$ with the increase in the disc rotation speed N2 continuously decreases. Then, at the predetermined rotation speed Nb, the internal gain $K_B$ indicates the maximum value, and when the disc rotation speed N2 becomes higher than the rotation speed Nb, the lute of increase in the internal gain $K_B$ turns negative. That is, the gain setting unit 61 (FIG. 4) changes the internal gain $K_B$ so that the change in the internal gain $K_B$ with the increase in the disc rotation speed N2 has a positive correlation with the change in the tilt sensitivity of the power rollers 16 with the increase in the disc rotation speed N2.

In this way, in both the low-speed range and the high-speed range, the sensitivity of the internal model of the position estimation unit 42 also increases or decreases so as to follow the increase or decrease in the tilt sensitivity of the power rollers 16 in accordance with the increase or decrease in the disc rotation speed N2. Therefore, it is possible to prevent a decrease in the estimation accuracy of roller positions $X_{est}$ due to the change in the disc rotation speed N2.

The present invention is not limited to the above-described embodiment, and the configurations can be changed, added, or deleted. For example, the sensitivity of the internal model of the position estimation unit 42 may be constant regardless of the disc rotation speed. The horizontal axis in FIGS. 5 to 7 is the output rotation speed N2, but may be the input rotation speed $N_1$. The toroidal continuously variable transmission 10 may drive another one without driving the generator.

REFERENCE SIGNS LIST

1 integrated drive generator
3 generator
10 toroidal continuously variable transmission
13 input disc
14 output disc
16 power roller
20 hydraulic actuator
40 transmission controller
42 position estimation unit
43 position control unit
44 actual transmission ratio calculation unit (actual transmission ratio acquisition unit)
48 target position calculation unit
60 gain setting unit
61 gain setting unit (second gain setting unit)
G1 calculation gain
$K_B$ internal gain
LP1 major closed-loop control LP2 minor closed-loop control (second closed-loop control)

The invention claimed is:

1. A transmission controller of a toroidal continuously variable transmission that changes a transmission ratio by changing a roller position of a power roller with respect to a disc by an actuator to change a tilt angle of the power roller, the transmission controller comprising:
- an actual transmission ratio acquisition unit that acquires an actual value of the transmission ratio;
- a target position calculation unit that calculates a target value of the roller position by closed-loop control so as to reduce a deviation between a command value of the transmission ratio and the actual value of the transmission ratio;
- a gain setting unit that adjusts a gain of the closed-loop control in accordance with a change in a rotation speed of the disc in a first rotation speed range and a second rotation speed range higher than the first rotation speed range,
- wherein the gain setting unit changes, in the first rotation speed range, the gain so that sensitivity of the closed-loop control decreases with an increase in the rotation speed, and changes, in the second rotation speed range, the gain so that a rate of decrease in the sensitivity of the closed-loop control with the increase in the rotation speed is smaller than that in the first rotation speed range.

2. The transmission controller of a toroidal continuously variable transmission according to claim 1, wherein the gain setting unit changes the gain so that the rate of decrease in the sensitivity in the second rotation speed range decreases continuously with the increase in the rotation speed.

3. The transmission controller of a toroidal continuously variable transmission according to claim 1, wherein the gain setting unit changes the gain so that a change in the gain with the increase in the rotation speed has an inverse correlation with a change in tilt sensitivity of the power roller with the increase in the rotation speed.

4. The transmission controller of a toroidal continuously variable transmission according to claim 1, further comprising:
- a position estimation unit that estimates an actual value of the roller position;
- a position control unit that calculates an operation command value for the actuator by second closed-loop control so as to reduce a deviation between the actual value and the target value of the roller position; and
- a second gain setting unit that adjusts sensitivity of an internal model of the position estimation unit in accordance with a change in the rotation speed in the first rotation speed range and the second rotation speed range higher than the first rotation speed range,
- wherein the second gain setting unit increases, in the first rotation speed range, the sensitivity of the internal model with the increase in the rotation speed, and changes, in the second rotation speed range, the sensitivity of the internal model so that a rate of increase in the sensitivity of the internal model with the increase in the rotation speed is smaller than that in the first rotation speed range.

* * * * *